(12) United States Patent
Arakt

(10) Patent No.: US 6,965,398 B2
(45) Date of Patent: Nov. 15, 2005

US006965398B2

(54) INTERNET CAMERA

(75) Inventor: Yoshiyuki Arakt, Saitama-ken (JP)

(73) Assignee: PENTAX Corporation, Tokyo (JP)

(*) Notice: Subject to any disclaimer, the term of this patent is extended or adjusted under 35 U.S.C. 154(b) by 719 days.

(21) Appl. No.: 09/790,588

(22) Filed: Feb. 23, 2001

(65) Prior Publication Data

US 2001/0017655 A1 Aug. 30, 2001

(30) Foreign Application Priority Data

Feb. 28, 2000 (JP) .......................... 2000-052440

(51) Int. Cl.$^7$ .......................... H04N 5/232; H04N 5/76; G06F 9/44

(52) U.S. Cl. .................. 348/211.3; 348/231.6; 717/171

(58) Field of Search ................. 348/143, 552, 348/211.99, 211.3, 207.1, 231.6, 231.3; 345/742; 396/300; 712/37; 717/168, 169, 170, 171, 172, 173

(56) References Cited

U.S. PATENT DOCUMENTS

| | | | |
|---|---|---|---|
| 4,531,161 A | 7/1985 | Murakoshi | |
| 4,746,993 A | 5/1988 | Tada | |
| 4,853,733 A | 8/1989 | Watanabe et al. | |
| 5,032,918 A | 7/1991 | Ota et al. | |
| 5,034,804 A | 7/1991 | Sasaki et al. | |
| 5,040,068 A | 8/1991 | Parulski et al. | |
| 5,062,010 A | 10/1991 | Saito | |
| 5,099,262 A | 3/1992 | Tanaka et al. | |
| 5,138,459 A | 8/1992 | Roberts et al. | |
| 5,146,353 A | 9/1992 | Isoguchi et al. | |
| 5,185,667 A | 2/1993 | Zimmermann | |
| 5,231,501 A | 7/1993 | Sakai | |
| 5,283,655 A | 1/1994 | Kanagawa | |
| 5,283,644 A | 2/1994 | Maeno | |

(Continued)

FOREIGN PATENT DOCUMENTS

| | | |
|---|---|---|
| JP | 3-268583 | 11/1991 |
| JP | 4-980 | 1/1992 |
| JP | 5-153453 | 6/1993 |

OTHER PUBLICATIONS

Corcoran et al.; "Internet Enabled Digital Photography"; 1999; IEEE; TUPM 6.2; pp. 84–85.*
3.3 Connectionless Transport: UDP, Ross and Kurose, http://www.net.cs.umass.edu/kurose/transport/UDP.html, 1996–2000.
English Language Abstract of JP 8-171691.
English Language Abstract of JP 8-102837.

(Continued)

*Primary Examiner*—Wendy R. Garber
*Assistant Examiner*—John M. Villecco
(74) *Attorney, Agent, or Firm*—Greenblum & Bernstein, P.L.C.

(57) ABSTRACT

An Internet camera, which operates in accordance with parameters contained in configuration data, is provided with a storage that stores the configuration data, a network interface for connecting the Internet with a predetermined site on the Internet. The Internet camera is further provided with a mail receiving system that receives an e-mail message through the Internet. The e-mail message may contain configuration data. If the configuration data is contained in the received e-mail message, it replaces the configuration data currently stored in the storage.

25 Claims, 8 Drawing Sheets

U.S. PATENT DOCUMENTS

| | | | |
|---|---|---|---|
| 5,295,077 A | 3/1994 | Fukuoka | |
| 5,343,243 A | 8/1994 | Maeda | |
| 5,367,332 A | 11/1994 | Kerns et al. | |
| 5,402,170 A | 3/1995 | Parulski et al. | |
| 5,414,464 A | 5/1995 | Sasaki | |
| 5,475,441 A | 12/1995 | Parulski et al. | |
| 5,477,264 A * | 12/1995 | Sarbadhikari et al. | 348/231.6 |
| 5,479,206 A | 12/1995 | Ueno et al. | |
| 5,486,853 A | 1/1996 | Baxter et al. | |
| 5,488,558 A | 1/1996 | Ohki | |
| 5,506,617 A | 4/1996 | Parulski et al. | |
| 5,528,293 A | 6/1996 | Watanabe et al. | |
| 5,535,011 A | 7/1996 | Yamagami et al. | |
| 5,541,656 A | 7/1996 | Kare et al. | |
| 5,544,315 A | 8/1996 | Lehfeldt et al. | |
| 5,550,586 A | 8/1996 | Kudo et al. | |
| 5,568,192 A | 10/1996 | Hannah et al. | |
| 5,581,299 A | 12/1996 | Raney et al. | |
| 5,587,928 A | 12/1996 | Jones et al. | |
| 5,606,365 A | 2/1997 | Maurinus et al. | |
| 5,612,732 A | 3/1997 | Yuyama et al. | |
| 5,631,701 A | 5/1997 | Miyake | |
| 5,633,678 A | 5/1997 | Parulski et al. | |
| 5,635,983 A * | 6/1997 | Ohmori | 348/231.6 |
| 5,640,204 A | 6/1997 | Tsutsui | |
| 5,646,684 A | 7/1997 | Nishizawa et al. | |
| 5,724,155 A * | 3/1998 | Saito | 358/402 |
| 5,734,425 A * | 3/1998 | Takizawa et al. | 348/231.9 |
| 5,754,227 A | 5/1998 | Fukuoka | |
| 5,796,426 A | 8/1998 | Gullichsen et al. | |
| 5,806,005 A | 9/1998 | Hull et al. | |
| 5,815,205 A | 9/1998 | Hashimoto et al. | |
| 5,818,537 A | 10/1998 | Enokida et al. | |
| 5,870,135 A | 2/1999 | Glatt et al. | |
| 5,887,140 A | 3/1999 | Itsumi et al. | |
| 5,911,044 A | 6/1999 | Lo et al. | |
| 5,917,542 A | 6/1999 | Moghadam et al. | |
| 5,990,941 A | 11/1999 | Jackson et al. | |
| 6,005,611 A | 12/1999 | Gullichsen et al. | |
| 6,006,039 A * | 12/1999 | Steinberg et al. | 396/57 |
| 6,034,716 A | 3/2000 | Whiting et al. | |
| 6,038,296 A | 3/2000 | Brunson et al. | |
| 6,043,837 A | 3/2000 | Driscoll, Jr. et al. | |
| 6,047,264 A | 4/2000 | Fisher et al. | |
| 6,061,502 A | 5/2000 | Ho et al. | |
| 6,065,062 A | 5/2000 | Periasamy et al. | |
| 6,067,571 A | 5/2000 | Igarashi et al. | |
| 6,094,221 A * | 7/2000 | Andersion | 348/231.6 |
| 6,104,430 A | 8/2000 | Fukuoka | |
| 6,134,606 A * | 10/2000 | Anderson et al. | 710/14 |
| 6,147,598 A | 11/2000 | Murphy et al. | |
| 6,167,469 A * | 12/2000 | Safai et al. | 710/62 |
| 6,188,431 B1 | 2/2001 | Oie | |
| 6,195,511 B1 * | 2/2001 | Harada | 396/300 |
| 6,204,877 B1 | 3/2001 | Kiyokawa | |
| 6,208,426 B1 | 3/2001 | Satto et al. | |
| 6,223,190 B1 | 4/2001 | Aihara et al. | |
| 6,226,449 B1 | 5/2001 | Noue et al. | |
| 6,256,059 B1 * | 7/2001 | Fichtner | 348/222.1 |
| 6,278,481 B1 | 8/2001 | Schmidt | |
| 6,300,976 B1 * | 10/2001 | Fukuoka | 348/231.99 |
| 6,331,869 B1 | 12/2001 | Furlan et al. | |
| 6,353,848 B1 * | 3/2002 | Morris | 709/203 |
| 6,360,362 B1 * | 3/2002 | Fichtner et al. | 717/168 |
| 6,374,406 B2 * | 4/2002 | Hirata | 725/132 |
| 6,389,464 B1 | 5/2002 | Krishnamurthy et al. | |
| 6,407,752 B1 | 6/2002 | Harnett | |
| 6,438,587 B2 | 8/2002 | Kitamura | |
| 6,441,924 B1 | 8/2002 | Matsui | |
| 6,452,629 B1 * | 9/2002 | Aizawa et al. | 348/231.99 |
| 6,525,761 B2 | 2/2003 | Sato et al. | |
| 6,539,547 B2 | 3/2003 | Driscll, Jr. et al. | |
| 6,556,241 B1 | 4/2003 | Yoshimura et al. | |
| 6,567,122 B1 | 5/2003 | Anderson et al. | |
| 6,571,271 B1 * | 5/2003 | Savitzky et al. | 709/200 |
| 6,583,813 B1 | 6/2003 | Enright et al. | |
| 6,591,279 B1 * | 7/2003 | Emens et al. | 707/201 |
| 6,594,032 B1 | 7/2003 | Hiroki et al. | |
| 6,603,502 B2 | 8/2003 | Martin et al. | |
| 6,624,846 B1 | 9/2003 | Lassiter | |
| 6,636,259 B1 * | 10/2003 | Anderson et al. | 348/211.3 |
| 6,654,060 B1 | 11/2003 | Kurosawa et al. | |
| 6,677,989 B1 | 1/2004 | Aizawa et al. | |
| 6,720,987 B2 | 4/2004 | Koyanagi et al. | |
| 6,747,692 B2 | 6/2004 | Patel et al. | |
| 6,751,297 B2 | 6/2004 | Nelkenbaum | |
| 2001/0024232 A1 * | 9/2001 | Suzuki | 348/207 |
| 2002/0053087 A1 | 5/2002 | Negishi et al. | |
| 2003/0025803 A1 | 2/2003 | Nakamura et al. | |
| 2003/0208567 A1 * | 11/2003 | Gross | 709/220 |
| 2004/0012811 A1 * | 1/2004 | Nakayama | 358/1.15 |

FOREIGN PATENT DOCUMENTS

| | | | |
|---|---|---|---|
| JP | 5-166090 | 7/1993 | |
| JP | 5-167979 | 7/1993 | |
| JP | 8-102837 | 4/1996 | |
| JP | 8-171691 | 7/1996 | |
| JP | 6-315106 | 11/1996 | |
| JP | 8-317268 | 11/1996 | |
| JP | 9-288684 | 11/1997 | |
| JP | 09288684 A * | 11/1997 | G06F/17/40 |
| JP | 9-307794 | 11/1997 | |
| JP | 10224676 | 8/1998 | |
| JP | 10243153 | 9/1998 | |
| JP | 10320685 | 12/1998 | |
| JP | 11-27567 | 1/1999 | |
| JP | 11-27650 | 1/1999 | |
| JP | 11341338 A * | 12/1999 | H04N/05/232 |
| JP | 3034243 | 2/2000 | |
| WO | 91/07850 | 5/1991 | |
| WO | 96/02106 | 1/1996 | |
| WO | 99/48276 | 9/1999 | |
| WO | 00/07341 | 2/2000 | |

OTHER PUBLICATIONS

NEC Picone digital camera, Instruction Manual for PC–DC200 and PC–DC200K, together with an English language translation of the same.

A printout of a News Release from NEC dated Feb. 13, 1997, relating to Picona digital camera.

English Language Abstract of JP11–27567.

English Language Abstract of JP11–27650.

Printout of a Website relating to Samsung "Webthru" cameras, printed on Aug. 14, 2001.

Samsung Webthru SWC 101/104 User's Guide, printed from Webthru web site on Aug. 14, 2001.

Samsung Webthru SWC160 User's Guide, printed from Webthru web site on Aug. 14, 2001.

A printout of a News Release from Apple dated May 13, 1996, relating to QuickTime image capture system.

"Apple's New Image–Capture Platform", Apple Directions, Aug. 1996, pp. 1, 15, 17–21.

A printout of a Press Release from Apple dated Feb. 17, 1997, relating to QuickTake 200 digital camera.

A printout of Apple Service Source Manual for QuickTake 200 digital camera.

A printout of Press Release from FlashPoint dated Dec. 8, 1997, relating to Digita operating system.

A printout of a Press Release from FlashPoint dated Jun. 15, 1998, relating to Kodak DC 220 and DC 260 cameras with Digita operating system.

"Digita Camera Operating System", the Kleper Report on Digital Publishing, Issue 3.6, Nov./Dec. 1998.

"FlashPoint shows how to process digital photos without a PC", EE Times, posted Apr. 16, 1998.

"Intranet TCP/IP Bible", Chapter 5, "TCP and UDP", pp. 62–99, Nobukazu Iguchi, Ohm Inc., May 30, 1997, together with an English language translation.

"Internet Yearbook '96", vol. 1, Sections 2, 4, pp. 28–33, 208–229, Gijyuto Hyouroun Inc., Apr. 5, 1996, together with an English language translation of the same.

Written Opposition to the Grant of a Patent issued with regard to Japanese Patent No. 3034243, together with an English language translation of the same.

Various "Sharp Zaurus MI–506" materials, including an "Introductory" Instruction Manual pp. 18–19, 22–27, 182–193, 234–235; a "Functional" Instruction Manual, pp. 1–5, 82–83; a "Zaurus Communication" Instruction Manual, pp. 1–7, 74–75, 124–125, 128–129; and a press release dated Jun. 23, 1997, pp. 1/11–11/11, together with an English language translation of each.

Correspondence of Page Numbers Between the Pages in Japanese Documents and the Pages in the English Translations.

Notice of Sending Copies of Written Opinions issued with regard to Japanese Patent No. 3034243, together with an English language translation of the same.

English language translation of a Notice of Reasons for Revocation, issued with regard to Japanese Patent No. 3034243.

A printout (labeled W–5) of a Web site relating to a "Carecams RCS5000", 1 page, printed Aug. 14, 1997.

A facsimile press release, PR Newswire file No. p1210083.106, transmitted Dec. 10, 1996, relating to an "Axis NetEye 200".

A printout (labeled W–8) of a Web site relating to "Omniview: Electronic Aim and Zoom Camera", printed on Feb. 6, 2001.

A printout (labeled W–9) of a Web site relating to "Interactive Pictures Presents the Whole Picture", printed on Feb. 6, 2001.

A printout (labeled W–10A) of a Web site relating to "Omniview Motionless Camera Orientation System", printed on Feb. 6, 2001.

A printout (labeled W–10B) of a Web site relating to "Stationary Camera Aims and Zooms Electronically", printed on Feb. 6, 2001.

English Language Abstract of JP 8–315106.

English Language Abstract of JP 10–224676.

English Language Abstract of JP 10–320685.

A printout (labeled W–1) of a World Wide Web site (Web site) relating to a "Hitachi MPEGCAM", 5 pages, printed Jul. 8, 1997.

A printout (labeled W–2) of a Web site relating to a "Microplex NetWorkEye", 2 pages, printed Aug. 14, 1997.

A printout (labeled W–3) of a Web site relating to a "StarDot WinCam", 3 pages, printed Aug. 5, 1997.

A printout (labeled W–4) of a Web site relating to an "MRT Observer", 1 page, printed Aug. 14, 1997.

A printout (labeled W–6A) of a Web site relating to an "EarthCam Internet Camera", 2 pages, printed Aug. 14, 1997.

A printout (labeled W–6B) of a Web site relating to the "EarthCam Internet Camera", 10 pages, printed Oct. 3, 1997.

A printout (labeled W–7) of a Web site relating to an "Axis NetEye", 1 page, printed Aug. 14, 1997.

Ricoh Digital Electronic Still (Video) Camera, Instruction Manual for Using DC–1, 1995, along with a partial English language translation.

Ricoh DC–1 brochure, May, 1995, along with a partial English language translation.

* cited by examiner

FIG. 2

| SECTION | PARAMETERS |
|---|---|
| SCHEDULE | CAMERA WORK WEEK |
|  | CAMERA WORK HOURS |
|  | TIME INTERVAL |
|  | ADDITIONAL SCHEDULING OPTIONS |
| TRANSFER | SERVER NAME |
|  | USER NAME |
|  | PASSWORD |
|  | FTP DIRECTORY & FILE NAME |
|  | TEST FTP |
| E-MAIL | E-MAIL OPTIONS |
|  | E-MAIL ACCOUNT |
| IMAGE | IMAGE QUALITY |
|  | COLOR MODE |
|  | IMAGE PROPERTIES |
|  | IMAGE SIZE |
|  | CAPTION/TIME STAMP |
| CLOCK | MANUAL/AUTOMATIC |
| DIAL-UP | TELEPHONE NUMBER OF SITE |
|  | ALTERNATE NUMBER |
|  | RETRIES |
|  | TIME OUT |
|  | DNS NUMBER |
|  | ALTERNATE DNS NUMBER |
|  | ISP PROTOCOL OR DIALUP INFORMATION |
| HARDWARE | TRIGGER |
|  | VIDEO SOURCE |
|  | MODEM BAUD RATE |
| VCI FILE | CHANGE THE CAMERA SETTING REMOTELY |
| LAN | T.B.D. |
| FILE | OPEN... |
|  | SAVE AS... |
| CAMERA | MODE |
|  | HISTORY |
|  | CLEAR HISTORY |
|  | TEST CAMERA |
|  | TEST PHONE LINE |
| CAPTURE | SINGLE IMAGE |
|  | SERIES OF IMAGES |
| HELP | HELP TOPICS |
|  | ABOUT CAMERA |

| TIME | CLIENT'S ACTION | CAMERA'S ACTION | RESULT |
|---|---|---|---|
| 0:00 | | *CHECK MAILBOX<br>*START TRANSFERRING | NO MAIL |
| 0:01 | *SEND MAIL TO THE MAILBOX OF THE INTERNET CAMERA | *CHECK MAILBOX<br>*START TRANSFERRING | NO MAIL |
| 0:02 | | *CHECK MAILBOX<br>*INTERRUPT TRANSFERRING<br>*CONFIGURE THE CAMERA ACCORDING TO THE MAIL | MAIL IS RECEIVED |
| 0:03 | | *CHECK MAILBOX<br>*RESUME TRANSFERRING | NO MAIL |
| 0:04 | | *CHECK MAILBOX | NO MAIL |
| 0:05 | | *CHECK MAILBOX<br>*FINISH TRANSFERRING | AN IMAGE IS TRANSFERRED |
| 0:06 | | *CHECK MAILBOX | NO MAIL |
| 0:07 | | *CHECK MAILBOX | NO MAIL |
| 0:08 | | *CHECK MAILBOX | NO MAIL |

FIG. 4

| TIME | CLIENT'S ACTION | CAMERA'S ACTION | RESULT |
|---|---|---|---|
| 0:00 | | *CHECK MAILBOX | NO MAIL |
| 0:01 | *SEND MAIL TO THE MAILBOX OF THE INTERNET CAMERA | *CHECK MAILBOX<br>*START A TRANSFERRING | NO MAIL |
| 0:02 | | *CHECK MAILBOX<br>*INTERRUPT TRANSFERRING<br>*DISCONNECT | MAIL IS RECEIVED |
| 0:03 | *UPLOAD CONFIGRATION FILE TO THE FTP SERVER | | |
| 0:04 | *MAKE CALL TO THE CAMERA CAUSE PREDETERMINED NUMBER OF RINGING TONES | *RECEIVE CALL FROM CLIENT<br>*RECONNECT TO THE INTERNET IF THE NUMBER OF RINGING TONES IS EQUAL TO A PREDETERMINED NUMBER<br>*OBTAIN CONFIGRATION FILE FROM THE FTP SERVER<br>*CONFIGURE THE INTERNET CAMERA ACCORDING TO THE CONFIGURATION FILE<br>*RESUME TRANSFERRING | |
| 0:06 | | *CHECK MAILBOX<br>*CHECK MAILBOX<br>*FINISH TRANSFERRING | NO MAIL<br>NO MAIL<br>IMAGE IS TRANSFERRED |
| 0:07 | | *CHECK MAILBOX | NO MAIL |
| 0:08 | | *CHECK MAILBOX | NO MAIL |
| 0:09 | | *CHECK MAILBOX | NO MAIL |

FIG. 7

INTERNET CAMERA

BACKGROUND OF THE INVENTION

The present invention relates to an Internet camera which is to be connected to the Internet for transmitting image data files to a predetermined site of a file server on the Internet.

Conventionally, a digital camera has been widely used. The digital camera captures an image, converts the image to digital data, and stores the digital image data in the form of data files in a storage device such as a hard disk.

Recently, as an application of the digital camera, an Internet camera has been used. An example of the Internet camera is disclosed in U.S. patent application Ser. No. 09/204,289, the teachings of which are incorporated herein by reference.

The conventional Internet camera typically includes a network interface such as a modem for sending the data files via the Internet, and a data transfer client such as an FTP (File Transfer Protocol according to RFC 959) client for controlling the network interface in order to transfer the data files stored in the storage device to a predetermined site of a file server such as an FTP server on the Internet.

The Internet camera includes a memory in which a configuration data file is stored. The Internet camera operates (e.g., captures the images and transmits the image data files) according to the configuration data file. The configuration data typically includes an address of the predetermined site, a password for uploading the data file to the server, and data for identifying quality of the captured images.

When a user of the Internet camera updates the configuration data file to change the settings of the camera in order to modify its operation, the user uploads a modified configuration data file on the predetermined site, to which the image data files are transmitted from the Internet camera. The conventional Internet camera then downloads the modified configuration data file, overwrites the modified configuration data file on the configuration data file stored in the memory. Generally, the modified configuration data file is uploaded from a client, which is remote from the Internet camera, through the Internet.

However, file servers on the Internet do not generally permit a plurality of clients to upload files at the same time. Further, the file servers do not generally permit double log-in. Therefore the user of the conventional Internet camera cannot upload the modified configuration file when the conventional Internet camera is transmitting an image data file to the file server.

SUMMARY OF THE INVENTION

It is therefore an object of the present invention for providing an improved Internet camera that operates in accordance with a configuration data file, which can be updated even when the Internet camera is transmitting an image data file to a predetermined site of a file server on the Internet.

For the object, according to an aspect of the invention, there is provided an Internet camera, which operates in accordance with parameters contained in configuration data, provided with a storage that stores the configuration data, a network interface, the Internet camera being connected with a predetermined site on the Internet, a mail receiving system that receives an e-mail message through the Internet, the e-mail message carrying modified configuration data, a controller that retrieves the modified configuration data from the e-mail message and stores the modified configuration data in the storage, the Internet camera operating in accordance with the modified configuration data.

With this configuration, even if the Internet camera is being connected to the predetermined site, the configuration data can be transmitted to the Internet camera, and stored in the storage.

Optionally, the Internet camera further includes an uploading system that uploads image data corresponding to images captured by the Internet camera to a predetermined site on the Internet through the network interface.

Further, the controller may interrupt uploading of the image data if the mail receiving system receives the e-mail message containing the modified configuration data.

In such a case, it is preferable that the controller resumes transferring of the image data when the controller has stored the modified configuration data in the storage.

Further optionally, the Internet camera may include a mail analyzing device that analyzes the received e-mail message to check whether the received e-mail message contains the modified configuration data.

Still optionally, the configuration data may include a schedule script which defines schedule of capturing of images and/or transferring of image data.

According to another aspect of the invention, there is provided an Internet camera that operates in accordance with parameters contained in configuration data, provided with a storage that stores the configuration data, a network interface including a modem, the Internet camera being connected with a predetermined site on the Internet, a mail receiving system that receives an e-mail message through the Internet, the e-mail message carrying a predetermined command, a controller that controls the network interface to disconnect the Internet camera from the Internet when the predetermined command is received, a sound detecting system that detects a predetermined sound, the predetermined sound being generated by the modem when the modem receives a call, the controller connects the Internet camera when the predetermined sound is detected, and a downloading system that downloads modified configuration data from the predetermined site if the predetermined sound is detected. With this configuration, the controller stores the downloaded modified configuration data in the storage, the Internet camera operating in accordance with the modified configuration data.

According to the above-described configuration, even if the Internet camera is connected to the predetermined site of the file server, a user can cut the connection only by sending an e-mail message, and thereafter, the user can upload the configuration data file to the predetermined site. Further, the user can control the Internet camera to download the newly uploaded configuration data file by making a telephone call to the modem.

Optionally, the Internet camera further includes an uploading system that uploads image data corresponding to images captured by the Internet camera to the predetermined site on the Internet through the network interface.

In this case, the controller may interrupt uploading of the image data when the predetermined command is received while the image data is being uploaded to the predetermined site.

Further, if uploading of the image data has been interrupted as the predetermined command has been received, the controller resumes uploading of the image data after the modified configuration data is downloaded and stored in the storage.

Still optionally, the Internet camera may include a mail analyzing device that analyzes the received e-mail message to check whether the received e-mail message contains the predetermined command.

Furthermore, the sound detecting system may determine that the predetermined sound is generated if a predetermined number of ringing tones are generated by the modem.

Alternatively, the sound detecting system may be configured to determine that the predetermined sound is generated if the number of ringing tones generated by the modem is equal to or greater than a predetermined number.

According to a further aspect of the invention, there is provided an Internet camera that operates in accordance with parameters contained in configuration data, provided with a storage that stores the configuration data, a network interface including a modem, the Internet camera being connected with a predetermined site on the Internet, a mail receiving system that receives an e-mail message through the Internet, the e-mail message carrying a predetermined command, a controller that controls the network interface to disconnect the Internet camera from the Internet when the predetermined command is received, a timer that measures time duration since the Internet camera is disconnected from the Internet, the controller connects the Internet camera when a predetermined time duration has elapsed from the disconnection, and a downloading system that downloads modified configuration data from the predetermined site when the predetermined time has elapsed and the Internet camera is re-connected to the Internet. In this configuration, the controller stores the downloaded modified configuration data in the storage, the Internet camera operating in accordance with the modified configuration data.

Optionally, the Internet camera may include an uploading system that uploads image data corresponding to images captured by the Internet camera to the predetermined site on the Internet through the network interface.

Further optionally, the controller may interrupt uploading of the image data when the predetermined command is received while the image data is being uploaded to the predetermined site.

In such a case, if uploading of the image data has been interrupted as the predetermined command has been received, the controller preferably resumes uploading of the image data after the modified configuration data is downloaded and stored in the storage.

Still optionally, the Internet camera may include a mail analyzing device that analyzes the received e-mail message to check whether the received e-mail message contains the predetermined command.

According to a further aspect of the invention, there is provided an Internet camera that operates in accordance with parameters contained in configuration data, provided with a storage that stores the configuration data, a network interface including a modem, the Internet camera being connected with a predetermined site on the Internet, a mail receiving system that receives an e-mail message through the Internet, the e-mail message carrying a predetermined command, a controller that controls the network interface to disconnect the Internet camera from the Internet when the predetermined command Is received, a sound detecting system that detects a predetermined sound, the sound detecting system including an answering machine that answers a call to the modem, the predetermined sound including touch tones, the controller connecting the Internet camera when the predetermined sound is detected, and a downloading system that downloads modified configuration data from the predetermined site if the predetermined sound is detected. With this configuration, the controller stores the downloaded modified configuration data in the storage, the Internet camera operating in accordance with the modified configuration data.

BRIEF DESCRIPTION OF THE ACCOMPANYING DRAWINGS

FIG. 2 shows a data structure of the configuration data file;

FIG. 4 is an exemplary time table showing an operation according to the first embodiment of the present invention;

FIG. 7 is an exemplary time table showing an operation according to the second embodiment of the present invention.

DETAILED DESCRIPTION OF THE EMBODIMENTS

Figure 1:
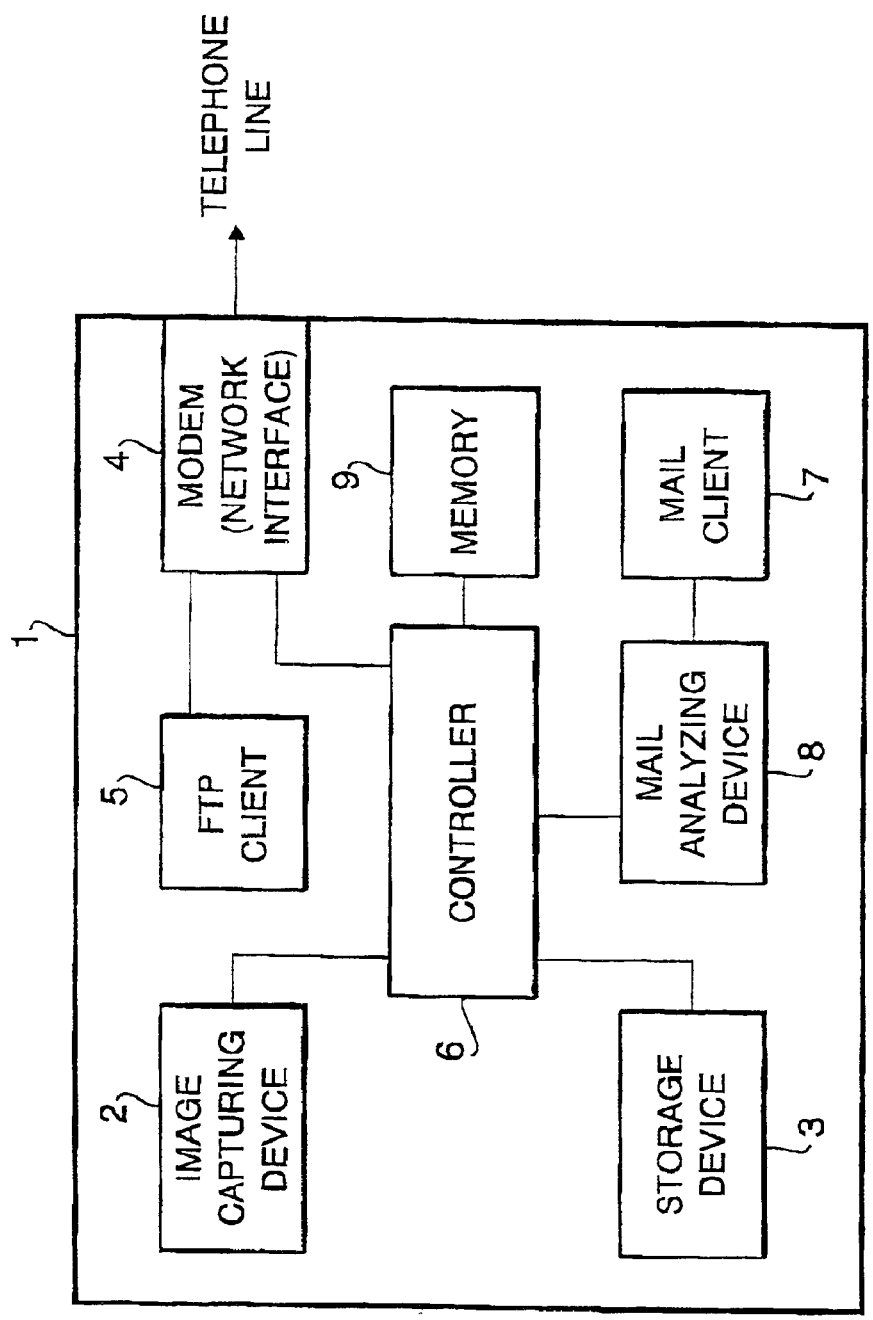
FIG. 1 is a block diagram of an Internet camera according to a first embodiment of the present invention.

FIG. 1 is a block diagram of an Internet camera according to a first embodiment of the present invention. The Internet camera 1 includes an image capturing device 2, a storage device 3, a controller 6 including a CPU, a memory 9, an FTP client 5, a modem (network interface) 4, a mail client 7, and a mail analyzing device 8.

In the Internet camera 1, the controller 6 controls the image capturing device 2 to capture an image and obtains image data. The image data is stored in the storage device 3 as an image data file. The storage device 3 is capable of storing a plurality of image data files captured at different timings. The modem 4 connects the Internet camera 1 to the Internet through a telephone line.

The FTP client 5, which is controlled by the controller 6, controls the modem 4 to transmit the image data files stored in the storage device 3 to a predetermined site of an FTP server (not shown) on the Internet, through the telephone line.

The Internet camera 1 operates in accordance with parameters contained in a configuration data file that is stored in the memory 9. That is, an image is captured and/or transmitted in accordance with the parameters contained in the configuration data file stored in the memory 9.

FIG. 2 shows an example of parameters included in the configuration data file. The images are captured according to parameters at an "Image" section, and the image data files are transmitted according to parameters at a "Transfer" section.

Further, the controller 6 retrieves the schedule data from parameters at a "Schedule" section of the configuration data file, and controls the Internet camera 1 to capture images and transfer the image data files in accordance with the schedule data. It should be noted that, in the embodiments described in this specification, capturing of an image is performed in accordance with the parameters of "Schedule" section. Immediately after the capturing of image, an image data file corresponding to the captured image is transmitted to the predetermined site.

The Internet camera 1 is configured to receive an e-mail message including a modified configuration data file attached thereto. The mail client 7 controls the network interface 4 to receive an e-mail message posted to a predetermined mail address, which is directed to the Internet camera 1, of a mail server on the Internet. The mail analyzing device 8 analyzes received e-mail messages for determining if each of the received e-mail messages includes a modified configuration data file. If the e-mail message includes a modified configuration data file, the controller 6 retrieves the modified configuration data file, and overwrites the retrieved configuration data file on the configuration file currently stored in the memory 9, thereby the configuration data file being updated. It should be noted that even if the Internet camera 1 is transmitting an image data file to the server, the Internet camera 1 is capable of receiving e-mail messages. Therefore, in the first embodiment, the user can update the configuration data file simply by sending an e-mail message that includes a modified configuration data file.

Accordingly, even if the FTP server inhibits a plurality of clients from uploading files simultaneously, the user can update the configuration data file when the Internet camera 1 is transmitting the image data file, or when the Internet camera 1 is being connected with the predetermined site of the FTP server.

Figure 3:
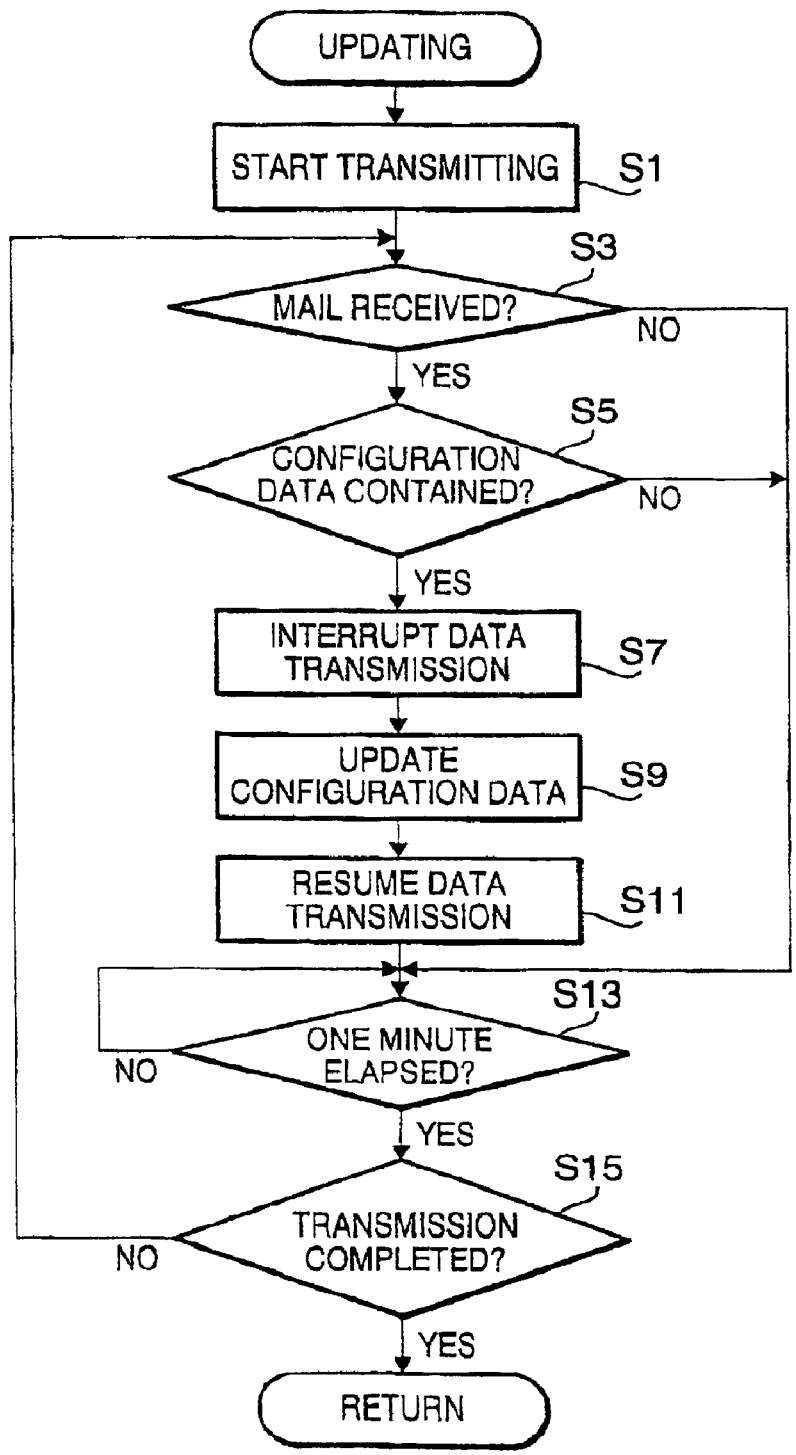
FIG. 3 shows a flowchart illustrating a file transmission operation according to the first embodiment of the invention.

FIG. 3 shows a flowchart illustrating an updating procedure performed by the Internet camera 1 when the image data file is being transmitted.

At S1, transmission of the image data is started. Then, at S3, the mall client 7 checks whether an e-mail message is received. If an e-mail message is received (S3:YES), it is detected whether the e-mail message contains a configuration data file. If the e-mail message contains the configuration data file (S5:YES), transmission of the image data is interrupted (S7), and the configuration data file contained in the e-mail message is overwritten in the memory 9 (S9). Then, at S11, transmission of the image data is resumed, and control proceeds to S13. If no e-mail message is received (S3:NO) or the received e-mail message does not contain the configuration data file (S5:NO), control proceeds to S13.

At S13, it is detected whether one minute has elapsed since transmission of the image data was interrupted. If one minute has not elapsed (S13:NO), control repeatedly checks the elapsed time, while the image data file is kept transmitted. If one minute has elapsed (S13:YES), and if transmission of the image data file has not yet completed (S15:NO), control returns to S3, to perform another e-mail check operation. If transmission of the image data file has been completed (S15:YES), the procedure shown in FIG. 3 is terminated.

FIG. 4 is an example of a time table when the user sends an e-mail message in which a modified configuration data file is included, or to which a modified configuration data file is attached, according to the first embodiment.

The controller 6 of the Internet camera 1 controls the mail client 7 to check the predetermined mail address at every one minute. In this example, the Internet camera 1 starts to transmit an image data file at 0:00 in accordance with the schedule data at the "Schedule" section of the configuration data file, and it takes four minutes for transmitting one image data file. The user sends the e-mail message with a modified configuration file between 0:01 and 0:02. At 0:02, the mail client 7 receives the e-mail message. Then, the mail analyzing device 8 checks the received e-mail message in order to determine if the e-mail message includes a (modified) configuration data file.

Since, in this example, the e-mail message includes the data file, the controller 6 controls the FTP client 5 to interrupt transmission of the image data file, and derives the data file (i.e., the modified configuration data file) and overwrites the received (i.e., modified) configuration data file on the configuration data file presently stored in the memory 9.

Then, at 0:03, the controller 6 controls the FTP client 5 to resume the data file transmitting operation for transmitting the image data file. At 0:05, the data file transmitting operation is finished.

As above, according to the first embodiment, the modified configuration data file is sent to the Internet camera 1 by means of an e-mail message, and therefore, the configuration data is updated even if the Internet camera 1 is transmitting an image data file to the predetermined site of the FTP server (i.e., even when the Internet camera 1 is being connected to the predetermined site of the FTP server).

Figure 5:
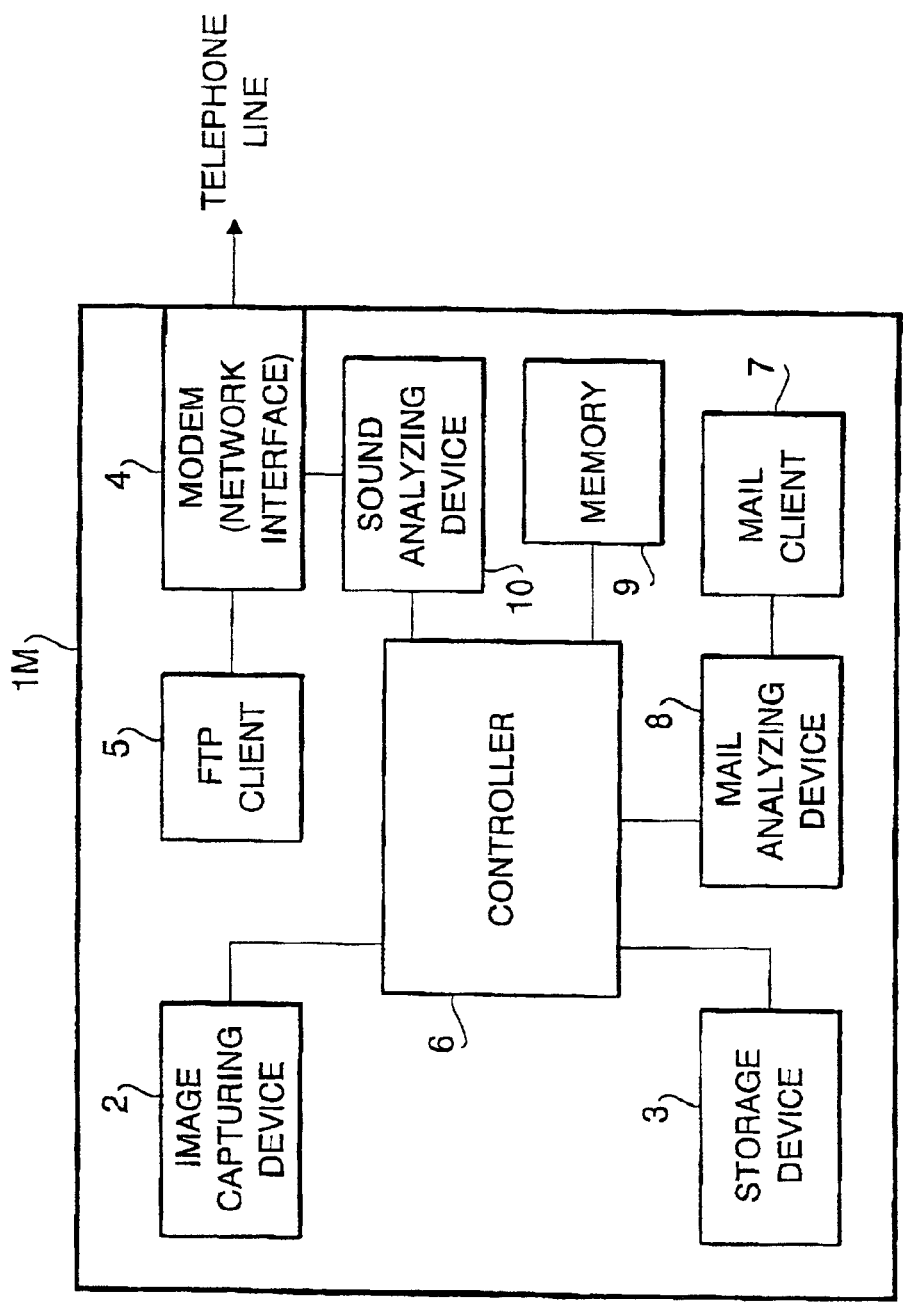
FIG. 5 is a block diagram of an Internet camera according to a second embodiment of the present invention.

FIG. 5 is a block diagram of an Internet camera 1M according to a second embodiment of the present invention.

The Internet camera 1M is similar to the Internet camera 1 according to the first embodiment, except that it further includes a sound analyzing device 10. The sound analyzing device 10 analyzes ringing tones of a telephone call which the modem 4 receives.

In the second embodiment, the user of the Internet camera 1 firstly sends an e-mail message which includes a command that causes the FTP client 5 to stop transmitting the image data file if the FTP client 5 is transmitting an image data file. When the mail client 7 receives the e-mail message, the controller 6 controls the FTP client 5 to stop image data file transmitting operation if the FTP client 5 is transmitting an image data file.

Then, the controller 6 controls the modem 4 to disconnect the Internet camera 1M from the Internet. Then, since the Internet camera 1M is no more connected to the FTP server, the user is capable of uploading a modified configuration data file on the predetermined site of the FTP server. After the modified configuration data file has been uploaded, the user makes a telephone call to the modem 4 of the Internet camera 1M to cause the modem 4 to generate a predetermined number of ringing tones, and then hangs up the telephone. It should be noted that the modem 4 is configured so as not answer the call, and therefore, the ringing tones are kept generated until the user hangs up the telephone. The ringing tones are detected by the sound analyzing device 10. That is, when the sound analyzing device 10 detects the predetermined number of ringing tones, the controller 6 controls the modem 4 to re-connect the Internet camera 1M to the Internet. Then the controller 6 controls the FTP client 5 to download the modified configuration data file which has been uploaded by the user when the Internet camera 1 is disconnected from the FTP server. The downloaded (i.e., modified) configuration data file is overwritten on the configuration file currently stored in the memory 9.

Figure 6:
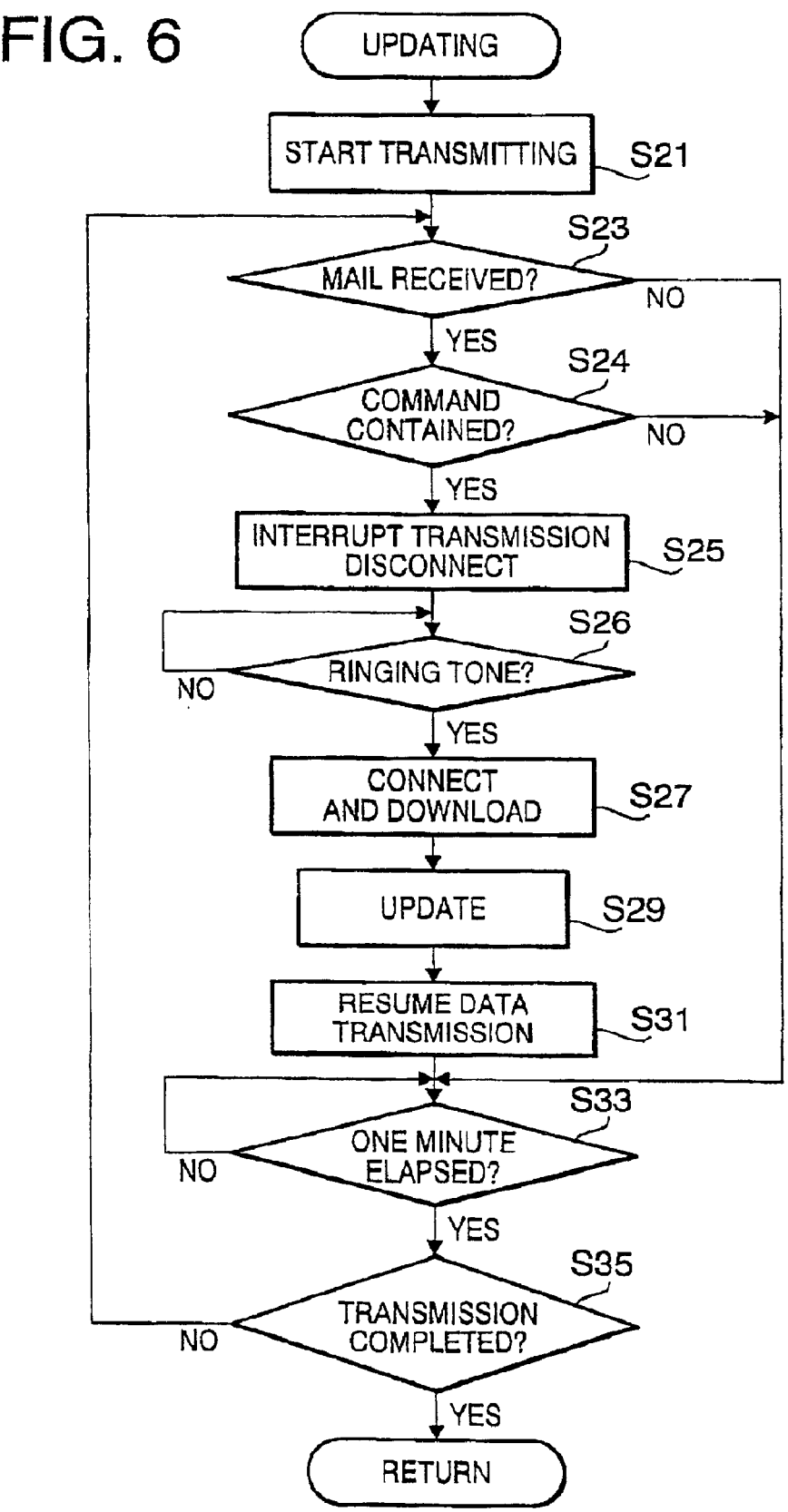
FIG. 6 shows a flowchart illustrating a file transmission procedure according to the second embodiment.

FIG. 6 shows a flowchart illustrating an updating procedure performed by the Internet camera 1M when the image data file is being transmitted to the predetermined site of the FTP server.

At S21, transmission of the image data is started in accordance with the schedule data at the "Schedule" section of the configuration data file. Then, at S23, the mail client 7 checks whether an e-mail message is received. If an e-mail message is received (S23:YES), it is detected whether the e-mail message contains a predetermined command (S24). If the e-mail message contains the predetermined command (S24:YES), transmission of the image data is interrupted and the Internet camera 1M is disconnected from the Internet (S25). The, at S26, it is detected whether a predetermined number of ringing tones are generated by the modem 4. It should be noted that the user uploads the modified configuration data file after the Internet camera 1M is disconnected from the Internet. Further, the user makes a telephone call to the modem 4 when transmission of the modified configuration data file is finished.

If the predetermined number of ringing tones are detected (S26:YES), the Internet camera 1M is re-connected to the Internet, and the configuration data file is downloaded (S27) from the FTP server and overwritten (S29) in the memory 9. Then, at S31, transmission of the image data is resumed, and control proceeds to S33. If no e-mail message is received (S23:NO) or the received e-mail message does not contain the predetermined command (S24:NO), control proceeds to S33.

At S33, it is detected whether one minute has elapsed since transmission of the image data was interrupted. If one minute has not elapsed (S33:NO), control repeatedly checks the elapsed time, while the image data file is kept transmitted. If one minute has elapsed (S33:YES), and if transmission of the image data file has not yet completed (S35:NO), control returns to S23, to perform another e-mail check operation. If transmission of the image data file has been completed (S35:YES), the procedure shown in FIG. 6 is terminated.

FIG. 7 is an example of a time table when the user sends an e-mail message including the command for disconnection, according to the second embodiment.

The controller 6 of the Internet camera 1M controls the mail client 7 to check the predetermined mail address at every one minute. In this example, the Internet camera starts to transmit am image data file at 0:00 in accordance with the schedule data. It takes four minutes for transmitting one image data file. The user sends the e-mail message containing the command between 0:01 and 0:02.

At 0:02, when the mail client 7 receives the e-mail message, the controller controls the FTP client 5 to interrupt transmission of the image data file. Then, the mail analyzing device 8 checks the received e-mail message in order to determine if the mail includes the predetermined command. Since the e-mail message includes the predetermined command in this example, the controller 6 controls the modem 4 to disconnect the Internet camera 1M from the Internet.

Then at 0:03, the user uploads a modified configuration data file on the predetermined site while the Internet camera 1 is held disconnected from the Internet.

For uploading the configuration data file, as described above, the user accesses the FTP server after the Internet camera 1 has been disconnected from the FTP server.

Therefore even if the FTP server does not allow a plurality of clients to upload files on one site at the same time, the user can upload the modified configuration data file.

Then at 0:04, after the modified configuration data file has been uploaded to the ETP server, the user makes a telephone call to the modem 4 of the Internet camera 1 to generate a predetermined number of ring tones, and then hangs on the telephone. The sound analyzing device 10 detects the predetermined number of ringing tones, and the controller 6 of the Internet camera 1M controls the modem 4 to re-connect the Internet camera 1 to the Internet. Then, the controller 6 of the Internet camera 1M controls the FTP client 5 to obtain the modified configuration data file, which was uploaded by the user at 0:03. The controller 6 overwrites the downloaded (i.e., modified) configuration data file on the configuration file stored in the memory 9, so that the Internet camera 1M operates according to the modified configuration data file. Thereafter, the controller 6 controls the FTP client 5 to resume transmitting of the image data file to the predetermined site. At 0:06, the data file transmitting operation is finished.

In the second embodiment, the sound analyzing device detects the ringing tones. This may be modified such that the sound analyzing device detects a predetermined combination of touch tones. In this case, the mode is configured to operate in an answer mode, in which the modem utilizes an answering circuit (not shown). The touch tones are generated when the user who calls the modem operates touch buttons of a telephone after the mode (i.e., the answering circuit) answers the call. In the (unmodified) second embodiment, the modem is configured to operate in a data communication mode (i.e., an originate mode), and not to answer calls. In this modification, FIG. 6 is modified such that, at S25, the operation mode of the modem is switched to the answer mode. Alternatively, the modem may be configured to answer mode from the beginning. Upon detection of a predetermined combination of touch tones, the Internet camera 1M is re-connected to the Internet and starts downloading the data file from the FTP server at S27.

Alternatively, the sound analyzing device may be configured to detect whether the number of ringing tones exceeds a predetermined number or not.

It should be noted that the present invention is not limited to the embodiments and examples described above. For instance, the second embodiment may be modified such that the modem 4 may be re-connected to the Internet when a predetermined time duration has passed after the modem is disconnected from the Internet. Such a modification is illustrated in FIG. 8.

Figure 8:
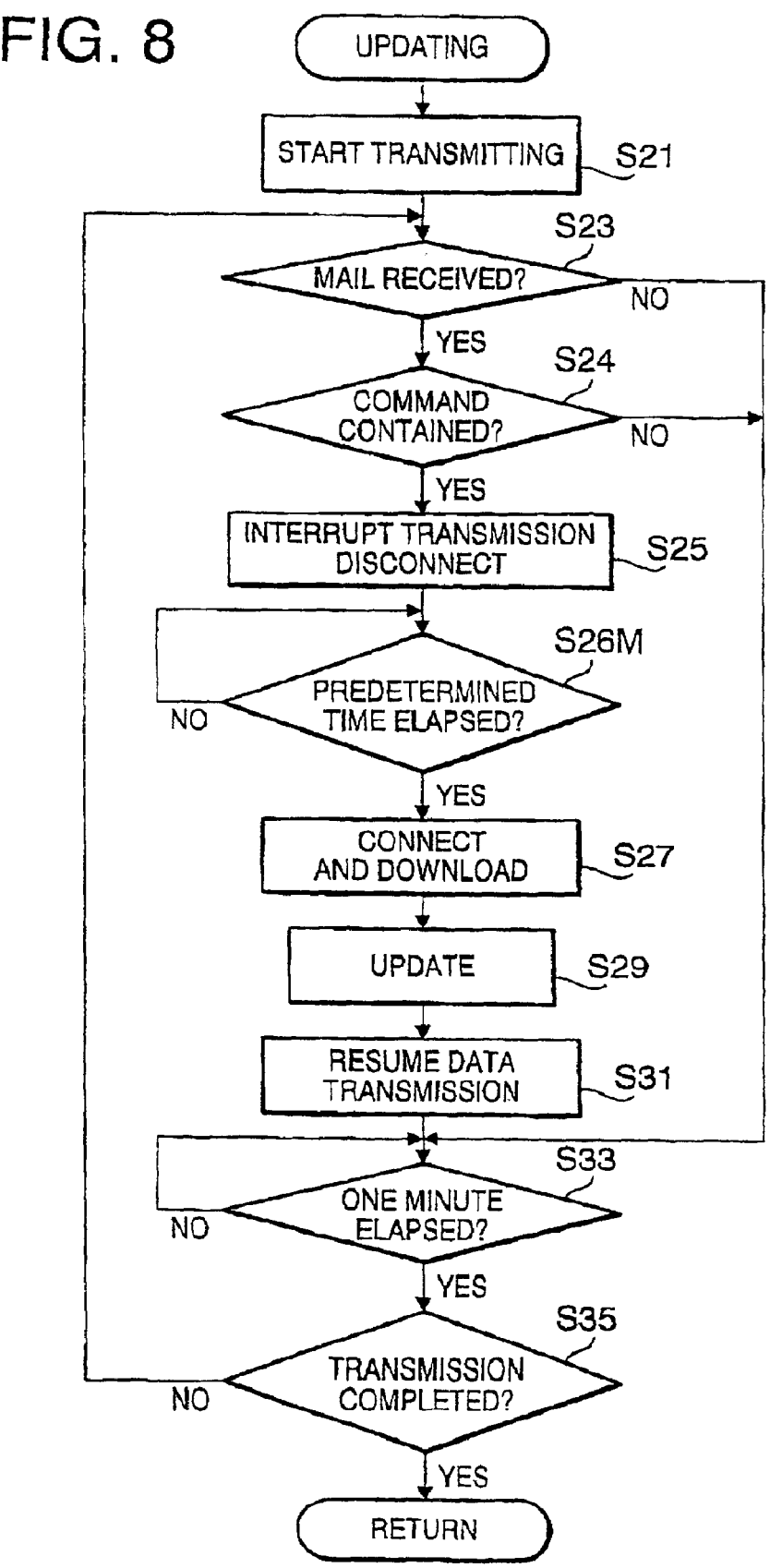
FIG. 8 shows a flowchart illustrating a file transmission procedure according to a modification of the second embodiment.

FIG. 8 shows a flowchart illustrating an updating procedure, which is a modification of the procedure shown in FIG. 6. According to this modification, the sound analyzing device 10 employed in the Internet camera 1M is omitted, and a timer for measuring duration of time is employed instead. In a particular case, the timer may be included in the controller 6.

In the procedure shown in FIG. 8, instead of detecting the ringing tones (FIG. 6, S26), it is judged whether a predetermined time has elapsed, at S26M, since transmission of the image data was interrupted and the Internet camera was disconnected from the Internet. The predetermined time corresponds to a period of time during which the user may complete uploading the modified configuration data file to the predetermined site of the FTP server.

In the embodiments and modification described above, the image data file is transmitted immediately when the image is captured. However, it can be modified such that the stored image data files may be transferred in accordance with a procedure, which is different from the image capturing procedure. Such a procedure may be defined using parameters contained in the configuration data file.

The present disclosure relates to the subject matter contained in Japanese Patent Application No. 2000-052440, filed on Feb. 28, 2000, which is expressly incorporated herein by reference in its entirety.

What is claimed is:

1. An Internet camera that operates in accordance with parameters contained in configuration data, comprising:

a storage that stores said configuration data;

a network interface, said Internet camera being connected with a predetermined site on the Internet;

a mail receiving system that receives an e-mail message through the Internet, said e-mail message carrying modified configuration data;

a controller that retrieves the modified configuration data from said e-mail message and stores the modified configuration data in said storage, said Internet camera operating in accordance with said modified configuration data.

2. The Internet camera according to claim 1, further comprising an uploading system that uploads image data corresponding to images captured by said Internet camera to a predetermined site on the Internet through said network interface.

3. The Internet camera according to claim 2, wherein said controller interrupts uploading of the image data if said mail receiving system receives the e-mail message containing said modified configuration data.

4. The Internet camera according to claim 3, wherein said controller resumes transferring of said image data when said controller has stored the modified configuration data in said storage.

5. The Internet camera according to claim 1, further comprising a mail analyzing device that analyzes the received e-mail message to check whether the received e-mail message contains the modified configuration data.

6. The Internet camera according to claim 1, wherein said configuration data includes a schedule script which defines schedule of capturing of images and/or transferring of image data.

7. An Internet camera that operates in accordance with parameters contained in configuration data, comprising:

a storage that stores said configuration data;

a network interface including a modem, said Internet camera being connected with a predetermined site on the Internet;

a mail receiving system that receives an e-mail message through the Internet, said e-mail message carrying a predetermined command;

a controller that controls said network interface to disconnect said Internet camera from the Internet when said predetermined command is received;

a sound detecting system that detects a predetermined sound, said predetermined sound being generated by said modem when said modem receives a call, wherein said controller connects said Internet camera when said predetermined sound is detected; and a downloading system that downloads modified configuration data from said predetermined site if said predetermined sound is detected, wherein said controller stores the downloaded modified configuration data in said storage, said Internet camera operating in accordance with said modified configuration data.

8. The Internet camera according to claim 7, further comprising an uploading system that uploads image data corresponding to images captured by said Internet camera to said predetermined site on the Internet through said network interface.

9. The Internet camera according to claim 8, wherein said controller interrupts uploading of the image data when said predetermined command is received while the image data is being uploaded to said predetermined site.

10. The Internet camera according to claim 9, wherein, if uploading of the image data has been interrupted as said predetermined command has been received, said controller resumes uploading of the image data after said modified configuration data is downloaded and stored in said storage.

11. The Internet camera according to claim 7, further comprising a mail analyzing device that analyzes the received e-mail message to check whether the received e-mail message contains the predetermined command.

12. The Internet camera according to claim 7, wherein said sound detecting system determines that said predetermined sound is generated if a predetermined number of ringing tones are generated by said modem.

13. The Internet camera according to claim 7, wherein said sound detecting system determines that said predetermined sound is generated if the number of ringing tones generated by said modem is equal to or greater than a predetermined number.

14. An Internet camera that operates in accordance with parameters contained in configuration data, comprising:

a storage that stores said configuration data;

a network interface including a modem, said Internet camera being connected with a predetermined site on the Internet;

a mail receiving system that receives an e-mail message through the Internet, said e-mail message carrying a predetermined command;

a controller that controls said network interface to disconnect said Internet camera from the Internet when said predetermined command is received;

a timer that measure time duration since said Internet camera is disconnected from the Internet, wherein said controller disconnects said Internet camera when a predetermined time duration has elapsed form the disconnection; and a downloading system that downloads modified configuration data from said predetermined site when said predetermined time has elapsed and said Internet camera is re-connected to the Internet, wherein said controller stores the downloaded modified configuration data in said storage, said Internet camera operating in accordance with said modified configuration data.

15. The Internet camera according to claim 14, further comprising an uploading system that uploads image data corresponding to images captured by said Internet camera to said predetermined site on the Internet through said network interface.

16. The Internet camera according to claim 15, wherein said controller interrupts uploading of the image data when said predetermined command is received while the image data is being uploaded to said predetermined site.

17. The Internet camera according to claim 16, wherein, if uploading of the image data has been interrupted as said predetermined command has been received, said controller resumes uploading of the image data after said modified configuration data is downloaded and stored in said storage.

18. The Internet camera according to claim 14, further comprising a mail analyzing device that analyzes the received e-mail message to check whether the received e-mail message contains said predetermined command.

19. An Internet camera that operates in accordance with parameters contained in configuration data, comprising:

a storage that stores said configuration data;

a network interface including a modem, said Internet camera being connected with a predetermined site on the Internet;

a mail receiving system that receives an e-mail message through the Internet, said e-mail message carrying a predetermined command;

a controller that controls said network interface to disconnect said Internet camera from the Internet when said predetermined command is received;

a sound detecting system that detects a predetermined sound, said sound detecting system including an answering machine that answers a call to said modem, said predetermined sound including touch tones, said controller connecting said Internet camera when said predetermined sound is detected; and a downloading system that downloads modified configuration data from said predetermined site if said predetermined sound is detected, wherein said controller stores the downloaded modified configuration data in said storage, said Internet camera operating in accordance with said modified configuration data.

20. An Internet camera which operates in accordance with parameters contained in configuration data, comprising:

a storage which stores said configuration data;

a network interface permitting said Internet camera to be connectible to a predetermined site on the Internet via a first type of connection;

a message receiving system which receives a message via a second type of connection that is different from said first type of connection; and a controller which, in response to a message received via said message receiving system, retrieves modified configuration data from said predetermined site and stores the modified configuration data in said storage, said Internet camera operating in accordance with said modified configuration data.

21. The Internet camera according to claim 20, wherein the message receiving system includes at least one of a telephone modem or an E-mail system.

22. The Internet camera according to claim 20, wherein the first type of connection includes a file transfer system.

23. The Internet camera according to claim 20, wherein the message does not include the configuration file.

24. The Internet camera according to claim 20, wherein the second type of connection connects to the network interface when the first type of connection is active.

25. The Internet camera according to claim 20, wherein the first and second types of connection each include an Internet-protocol connection.

* * * * *

UNITED STATES PATENT AND TRADEMARK OFFICE
CERTIFICATE OF CORRECTION

PATENT NO.         : 6,965,398 B2                                                    Page 1 of 1
APPLICATION NO. : 09/790588
DATED                 : November 15, 2005
INVENTOR(S)        : Yoshiyuki Araki It is certified that error appears in the above-identified patent and that said Letters Patent is hereby corrected as shown below:

On the title page, at Item (54), and column 1, line 1: Title, "INTERNET CAMERA" should be --INTERNET CAMERA RECEIVING CONFIGURATION DATA VIA E-MAIL--.

On the title page, Item (75): under Inventor Name, "ARAKT" should be --ARAKI--.

Signed and Sealed this

Twentieth Day of April, 2010

David J. Kappos
*Director of the United States Patent and Trademark Office*